United States Patent
Zhang et al.

(10) Patent No.: US 10,440,396 B2
(45) Date of Patent: Oct. 8, 2019

(54) FILTER INFORMATION SHARING AMONG COLOR COMPONENTS

(71) Applicant: QUALCOMM Incorporated, San Diego, CA (US)

(72) Inventors: Li Zhang, San Diego, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/937,687

(22) Filed: Mar. 27, 2018

(65) Prior Publication Data

US 2018/0288441 A1 Oct. 4, 2018

Related U.S. Application Data

(60) Provisional application No. 62/477,950, filed on Mar. 28, 2017.

(51) Int. Cl.

| | |
|---|---|
| *H04N 19/80* | (2014.01) |
| *H04N 19/176* | (2014.01) |
| *H04N 19/186* | (2014.01) |
| *H04N 19/44* | (2014.01) |
| *H04N 19/107* | (2014.01) |

(Continued)

(52) U.S. Cl.
CPC .......... *H04N 19/80* (2014.11); *H04N 19/107* (2014.11); *H04N 19/117* (2014.11); *H04N 19/14* (2014.11); *H04N 19/159* (2014.11); *H04N 19/167* (2014.11); *H04N 19/176* (2014.11);

(Continued)

(58) Field of Classification Search
None
See application file for complete search history.

(56) References Cited

U.S. PATENT DOCUMENTS

| | | | |
|---|---|---|---|
| 6,456,340 B1 * | 9/2002 | Margulis | G06T 1/20 345/501 |
| 9,179,167 B2 * | 11/2015 | Alshin | H04N 19/59 |

(Continued)

OTHER PUBLICATIONS

ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.

(Continued)

*Primary Examiner* — Frederick D Bailey
(74) *Attorney, Agent, or Firm* — Shumaker & Sieffert, P.A.

(57) ABSTRACT

A video decoder can be configured to determine first filter information for a first luma block unit of a current block; filter the first luma block unit based on the first filter information; determine second filter information for a second luma block unit of the current block; filter the second luma block unit based on the second filter information; and derive third filter information for a chroma block unit of the current block based on filter information determined for multiple luma block units, wherein the filter information determined for the multiple luma block units includes the first filter information for the first luma block unit and the second filter information for the second luma block unit; filter the chroma block unit based on the third filter information; and output a decoded version of the current block.

24 Claims, 8 Drawing Sheets

(51) Int. Cl.
*H04N 19/159* (2014.01)
*H04N 19/117* (2014.01)
*H04N 19/14* (2014.01)
*H04N 19/82* (2014.01)
*H04N 19/167* (2014.01)

(52) U.S. Cl.
CPC ........... *H04N 19/186* (2014.11); *H04N 19/44* (2014.11); *H04N 19/82* (2014.11)

(56) References Cited

U.S. PATENT DOCUMENTS

| | | | |
|---|---|---|---|
| 2013/0101018 A1 | 4/2013 | Chong et al. | |
| 2015/0078441 A1* | 3/2015 | Han | H04N 19/124 375/240.03 |
| 2015/0206279 A1* | 7/2015 | Amirghodsi | G06T 3/0006 382/300 |
| 2015/0363921 A1* | 12/2015 | Baek | G06T 5/006 348/241 |
| 2015/0365600 A1* | 12/2015 | Pollack | H04N 5/23293 348/239 |
| 2017/0238020 A1 | 8/2017 | Karczewicz et al. | |
| 2018/0041778 A1 | 2/2018 | Zhang et al. | |

OTHER PUBLICATIONS

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

Chen, et al., "Algorithm Description of Joint Exploration Test Model 6 (JEM 6)," Joint Video Exploration Team (JVET) of ITU-T SG 16 WP 3 and ISO/IEC JTC 1/SC 29/WG 11, 6th Meeting; Hobart, AU, Mar. 31-Apr. 7, 2017, Document: JVET-F1001_v3, Jun. 30, 2017, 48 pp.

Chen et al. "Coding tools investigation for next generation video coding," International Telecommunication Union Standardization Sector, ITU-T/Study Group 16—Contribution 806, Doc. COM 16-C806-E, Jan. 2015, 7 pp.

Wiegand, et al., "WD3: Working Draft 3 of High-Efficiency Video Coding," Joint Collaborative Team on Video Coding (JCT-VC) of ITU-T SG16 WP3 and ISO/IEC JTC1/SC29/WG11 5th Meeting: Geneva, CH, Mar. 16-23, 2011, JCTVC-E603, http://phenix.itsudparis.eu/jctldoc_end_user/documents/5_Geneva/wg11/JCTVC-E603-v8.zip, Jun. 27, 2011, 68 pp.

Karczewicz M., et al., "Improvements on Adaptive Loop Filter," 2. JVET Meeting, Feb. 20, 2016-Feb. 26, 2016, San Diego, (The Joint Video Exploration Team of ISO/IEC JTC1/SC29/WG11 and ITU-T SG.16 ), No. JVET-B0060-v2, Feb. 20, 2016 (Feb. 20, 2016), XP030150068, URL: http://phenix.int-evry.fr/jvet/.

Karczewicz M., et al., "EE2.5: Improvements on adaptive loop filter," Joint Video Exploration Team (JVET) of ITU-T SG 16 WP 3 and ISO/IEC JTC 1/SC 29/WG 11, 3rd Meeting: Geneva, CH, Document: JVET-C0038, May 26-Jun. 1, 2016, pp. 1-4.

Wang Y-K. et al., "High Efficiency Video Coding (HEVC) Defect Report," Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.

Ford et al., "Colour space conversions," University of Westminster, London, Tech. Rep., Aug. 11, 1998, 31 pp.

An, et al., "Unified Adaptive Loop Filter for Luma and Chroma," JVET Meeting, Feb. 12, 2017-Feb. 20, 2017, Geneva; CH; (The Joint Video Exploration Team of ISO/IEC JTC1/SC29/WG11 and ITU-T SG.16 ), JVET-E0079r1, Jan. 10, 2017, 6 pp.

An, et al., "Unified Adaptive Loop Filter for Luma and Chroma," JVET Meeting, Mar. 31, 2017-Apr. 7, 2017, Hobart; AU; (The Joint Video Exploration Team of ISO/IEC JTC1/SC29/WG11 and ITU-T SG.16 ), JVET-F0051, Mar. 23, 2017, 7 pp.

International Search Report and Written Opinion—PCT/US2018/024887—ISA/EPO—Jul. 27, 2018 (173636WO).

Kossentini F., et al., "CE8 Subtest 5: Adaptive Loop Filtering of Luminance and Chrominance Samples Using Same Filtering Shape, Structure and Map," JCTVC-F042, 97. MPEG Meeting; Jul. 18, 2011-Jul. 22, 2011; Torino; (Motion Picture Expert Group or ISO/IEC JTC1/SC29/WG11), No. m20447, Jul. 12, 2011 (Jul. 12, 2011), XP030049011, pp. 1-11.

* cited by examiner

Guide:

✗ = Location of luma sample

◯ = Location of chroma sample

4:2:0 sample format

4:2:2 sample format

4:4:4 sample format

FILTER INFORMATION SHARING AMONG COLOR COMPONENTS

This Application claims the benefit of U.S. Provisional Patent Application 62/477,950, filed 28 Mar. 2017, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), ITU-T H.265, High Efficiency Video Coding (HEVC), extensions of such standards, and other video coding standards or processes under development now or in the future. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques associated with filtering blocks of reconstructed video data in a video encoding and/or video decoding processes and, more particularly, this disclosure describes techniques related to adaptive loop filtering (ALF) and/or other types of loop filtering that are applied to reconstructed blocks of video data.

According to one example, a method for decoding video data includes determining first filter information for a first luma block unit of a current block; filtering the first luma block unit based on the first filter information; determining second filter information for a second luma block unit of the current block; filtering the second luma block unit based on the second filter information; and deriving third filter information for a chroma block unit of the current block based on filter information determined for multiple luma block units, the filter information determined for the multiple luma block units including the first filter information for the first luma block unit and the second filter information for the second luma block unit; filtering the chroma block unit based on the third filter information; and outputting a decoded version of the current block based on the filtering of the first luma block unit, the filtering of the second luma block unit, and the filtering of the chroma block unit.

According to another example, a device for decoding video data includes a memory configured to store the video data; and one or more processors configured to: determine first filter information for a first luma block unit of a current block; filter the first luma block unit based on the first filter information; determine second filter information for a second luma block unit of the current block; filter the second luma block unit based on the second filter information; derive third filter information for a chroma block unit of the current block based on filter information determined for multiple luma block units, the filter information determined for the multiple luma block units including the first filter information for the first luma block unit and the second filter information for the second luma block unit; filter the chroma block unit based on the third filter information; and output a decoded version of the current block based on the filtering of the first luma block unit, the filtering of the second luma block unit, and the filtering of the chroma block unit.

According to another example, an apparatus for decoding video data includes means for determining first filter information for a first luma block unit of a current block; means for filtering the first luma block unit based on the first filter information; means for determining second filter information for a second luma block unit of the current block; means for filtering the second luma block unit based on the second filter information; and means for deriving third filter information for a chroma block unit of the current block based on filter information determined for multiple luma block units, the filter information determined for the multiple luma block units including the first filter information for the first luma block unit and the second filter information for the second luma block unit; means for filtering the chroma block unit based on the third filter information; and means for outputting a decoded version of the current block based on the filtering of the first luma block unit, the filtering of the second luma block unit, and the filtering of the chroma block unit.

According to another example, a computer readable storage medium stores instructions that when executed by one or more processors cause the one or more processors to determine first filter information for a first luma block unit of a current block; filter the first luma block unit based on the first filter information; determine second filter information for a second luma block unit of the current block; filter the second luma block unit based on the second filter information; and derive third filter information for a chroma block unit of the current block based on filter information determined for multiple luma block units, the filter information determined for the multiple luma block units including the first filter information for the first luma block unit and the second filter information for the second luma block unit; filter the chroma block unit based on the third filter information; and output a decoded version of the current block based on the filtering of the first luma block unit, the filtering of the second luma block unit, and the filtering of the chroma block unit.

The details of one or more examples of the disclosure are set forth in the accompanying drawings and the description below. Other features, objects, and advantages will be apparent from the description, drawings, and claims.

DETAILED DESCRIPTION

Figure 1:
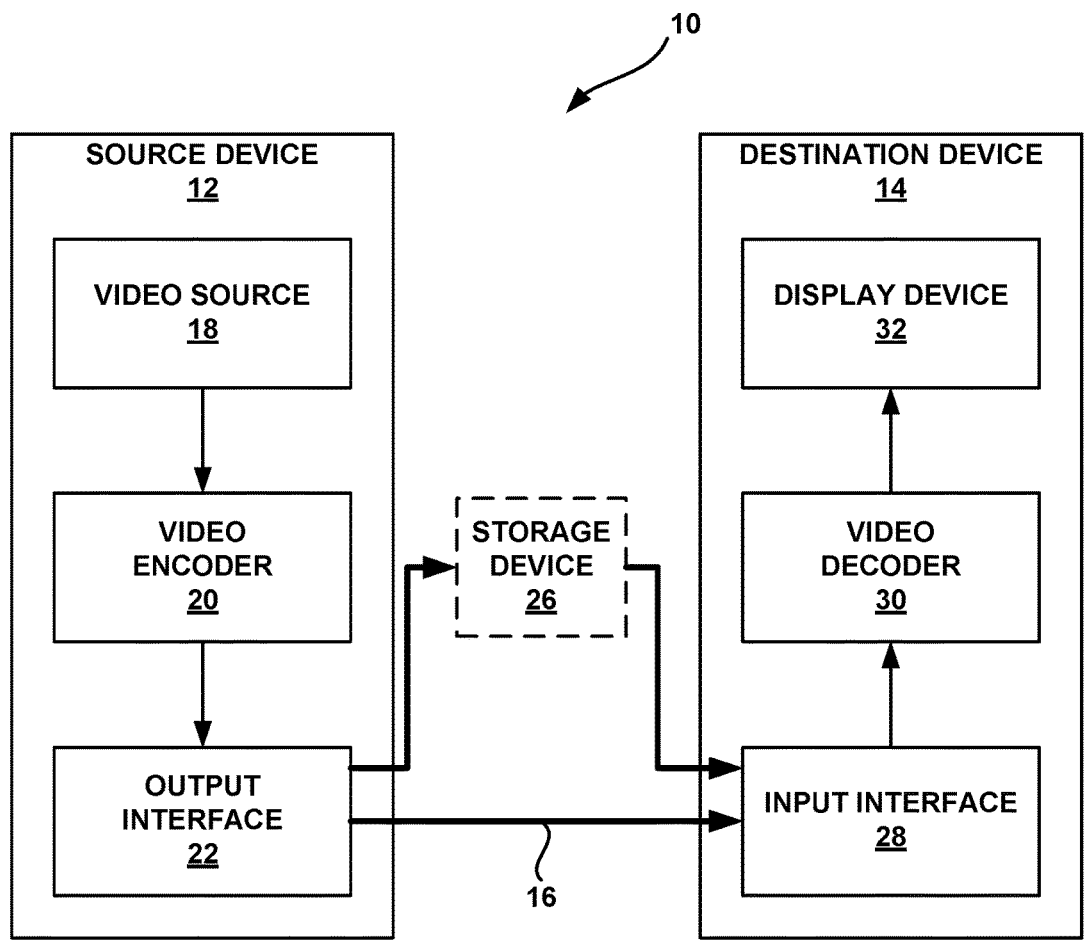
FIG. 1 is a block diagram illustrating an example video encoding and decoding system that may utilize the techniques described in this disclosure.

Video coding (i.e., video encoding and/or video decoding) involves predicting a block of video data from either an already coded block of video data in the same picture (e.g., intra prediction or intra block copy) or an already coded block of video data in a different picture (e.g., inter prediction). In some instances, a video encoder also calculates residual data by comparing the predictive block to the original block. Thus, the residual data represents a difference between the predictive block and the original block. The video encoder transforms and/or quantizes the residual data to reduce the number of bits needed to signal the residual data in the encoded bitstream.

A video decoder performs an inverse transform and dequantization process on the transformed and quantized residual data to determine the residual data calculated by the encoder. The video decoder adds the residual data to the predictive block to produce a reconstructed block of video data that matches the original video block more closely than the predictive block alone. As the processes of transforming and inverse transforming and quantizing and dequantizing may be lossy, the residual data determined by the video decoder may not perfectly match the residual data determined by the encoder. Thus, the reconstructed bock determined by the video decoder may not perfectly match the original block of video data.

To further improve the quality of decoded video, the video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may be determined by a video encoder and explicitly signaled in the encoded video bitstream or may be implicitly determined by both the video encoder and the video decoder.

This disclosure describes techniques associated with filtering reconstructed video data in video encoding and/or video decoding processes and, more particularly, this disclosure describes techniques related to ALF and/or other types of loop filtering. Compared to other types of loop filtering, ALF can require a relatively large signaling overhead to transmit the filter information from video encoder to video decoder and can also be computationally complex to apply. This disclosure describes techniques that may reduce the signaling overhead and computational complexity associated with ALF by having the video encoder and video decoder determine filter information for filtering chroma components based on filter information determined for filtering luma components. In some examples, the video encoder and video decoder may additionally or alternatively determine filter information for filtering luma components based on filter information determined for filtering chroma components.

In accordance with this disclosure, filtering is applied at a video encoder, and filter information is encoded in the bitstream to enable a video decoder to identify the filtering that was applied at the encoder. The video encoder may test several different filtering scenarios, and based on a rate-distortion analysis, choose a filter or set of filters that produces a desired tradeoff between decoded video quality and compression quality. The video decoder receives encoded video data that includes the filter information, decodes the video data, and applies filtering based on the filtering information. In this way, the video decoder applies the same filtering that was applied at the video encoder. As will be explained in more detail below, by deriving filter information for chroma blocks based on filter information determined for luma blocks (or vice-versa), the techniques of this disclosure may reduce the signaling overhead and computational complexity associated with various types of loop filtering, while at the same time, maintaining much, or all, of the benefits associated with the loop filtering.

Various techniques in this disclosure may be described with reference to video coding, which is intended to be a generic term that can refer to either video encoding or video decoding. Similarly, the term video coder is intended to be a generic term that can refer to either a video encoder or a video decoder. Unless explicitly stated otherwise, it should be assumed that techniques described with respect to a video encoder or a video decoder can be performed by the other of a video encoder or a video decoder. For example, in many instances, a video decoder performs the same, or sometimes a reciprocal, coding technique as a video encoder in order to decode encoded video data. In many instances, a video encoder also includes a video decoding loop, and thus the video encoder performs video decoding as part of encoding video data. Thus, unless stated otherwise, the techniques described in this disclosure with respect to a video decoder may also be performed by a video encoder (e.g., as part of the video decoding loop or as part of implicit determination of filter information), and vice versa.

This disclosure may also use terms such as current layer, current block, current picture, current slice, etc. In the context of this disclosure, the term current is intended to identify a layer, block, picture, slice, etc. that is currently being coded, as opposed to, for example, previously coded layers, blocks, pictures, and slices or yet to be coded blocks, pictures, and slices.

FIG. 1 is a block diagram illustrating an example video encoding and decoding system 10 that may utilize the various filtering techniques described in this disclosure. As shown in FIG. 1, system 10 includes a source device 12 that generates encoded video data to be decoded at a later time by a destination device 14. Source device 12 and destination device 14 may be any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may be any type of medium or device capable of moving the encoded video data from source device 12 to destination device 14. In one example, link 16 may be a communication medium to enable source device 12 to transmit encoded video data directly to destination device 14 in real-time. The encoded video data may be modulated according to a wireless communication standard, such as a wireless communication protocol, and transmitted to destination device 14. The communication medium may be any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general and may be applied to either wireless or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user and may be any of a variety of display devices such as a liquid crystal display (LCD), a plasma display, an organic light emitting diode (OLED) display, or another type of display device.

Video encoder 20 and video decoder 30 may operate according to a video compression standard, such as the ITU-T H.265, High Efficiency Video Coding (HEVC) standard or another standard. Video encoder 20 and video decoder 30 may additionally operate according to an HEVC extension, such as the range extension, the multiview extension (MV-HEVC), or the scalable extension (SHVC) which have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions, such as standards related to or based on the Joint Exploration Model (JEM) referenced below.

Video encoder 20 and video decoder 30 may also operate according to other proprietary or industry standards, such as the ITU-T H.264 standard, alternatively referred to as ISO/IEC MPEG-4, Part 10, Advanced Video Coding (AVC), or extensions of such standards, such as the Scalable Video Coding (SVC) and Multi-view Video Coding (MVC) extensions. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, and ISO/IEC MPEG-4 Visual.

Various groups, including the VCEG and the MPEG, are now studying the potential need for standardization of future video coding technology with a compression capability that significantly exceeds that of the current HEVC base standard and the HEVC extensions. The groups are working together on this exploration activity in a joint collaboration effort known as the Joint Video Exploration Team (JVET) to evaluate compression technology designs proposed by experts in this area. The JVET first met during 19-21 Oct. 2015. This algorithm description for JEM5 is described in J. Chen, E. Alshina, G. J. Sullivan, J.-R. Ohm, J. Boyce "Algorithm Description of Joint Exploration Test Model 5," JVET-F 1001, Geneva, January 2017. The latest version of reference software, i.e., Joint Exploration Model 5.0.1 (JEM 5.0.1) can be downloaded from: https://jvet.hhi.fraunhofer.de/svn/svn_HMJEMSoftware/tags/HM-16.6-JEM-5.0.1/.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In HEVC and other video coding specifications, a video sequence typically includes a series of pictures. Pictures may also be referred to as "frames." In one example approach, a picture may include three sample arrays, denoted SL, SCb, and Scr. In such an example approach, SL is a two-dimensional array (i.e., a block) of luma samples. SCb is a two-dimensional array of Cb chrominance samples. Scr is a two-dimensional array of Cr chrominance samples. Chrominance samples may also be referred to herein as "chroma" samples. In other instances, a picture may be monochrome and may only include an array of luma samples. Generally speaking, the luma component of a picture represents the brightness of the picture, and the chroma components of the picture represent the color information. As the human vision system typically has more sensitivity to luma than to chroma, HEVC and other video standards sometimes code chroma information using chroma subsampling, which reduces the resolution of chroma components in order to reduce the bitrate needed to code the video data.

To generate an encoded representation of a picture, in one example, video encoder 20 may generate a set of coding tree units (CTUs). Each of the CTUs may include a coding tree block of luma samples, two corresponding coding tree blocks of chroma samples, and syntax structures used to code the samples of the coding tree blocks. In monochrome pictures or pictures having three separate color planes, a CTU may include a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may include a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may include a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may include a prediction block of luma samples, two corresponding prediction blocks of chroma samples, and syntax structures used to predict the prediction blocks. In monochrome pictures or pictures having three separate color planes, a PU may include a single prediction block and syntax structures used to predict the prediction block. Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may include a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may include a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may include a sequence of Network Abstraction Layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Color video plays an essential role in multimedia systems, where various color spaces are used to efficiently represent color. A color space specifies color with numerical values using multiple components. A popular color space is the RGB color space, where color is represented as a combination of three primary color component values (i.e., red, green and blue). For color video compression, the YCbCr color space has been widely used as described in A. Ford and A. Roberts, "Colour space conversions," University of Westminster, London, Tech. Rep., August 1998. YCbCr can be converted from RGB color space via a linear transformation. The redundancy between different components, namely the cross component redundancy, can be significantly reduced in the YCbCr color space. One advantage of YCbCr is the backward compatibility with black and white televisions as the Y signal conveys the luminance information. In addition, chrominance bandwidth can be reduced by subsampling the Cb and Cr components in a 4:2:0 chroma sampling format. Subsampling in the YCbCr color space typically has significantly less subjective impact on video quality than subsampling in the RGB color. Due to these advantages, YCbCr has been the major color space in video compression. There are also other color spaces, such as YCoCg, used in video compression. This disclosure describes techniques with reference to the YCbCr color space, but the techniques described herein may also be utilized with other color spaces.

Chroma subsampling formats are typically expressed as a three-part ratio J:a:b (e.g. 4:4:4, 4:2:2, 4:2:0) that describe the number of luma and chroma samples in a conceptual region that is J pixels wide and 2 pixels high. "J" represents the horizontal sampling reference (i.e., the width of the conceptual region), which in HEVC is usually 4. "a" represents the number of chrominance samples (Cr, Cb) in the first row of J pixels, and "b" represents the number of changes of chrominance samples (Cr, Cb) between the first and the second row of J pixels.

Figure 2:
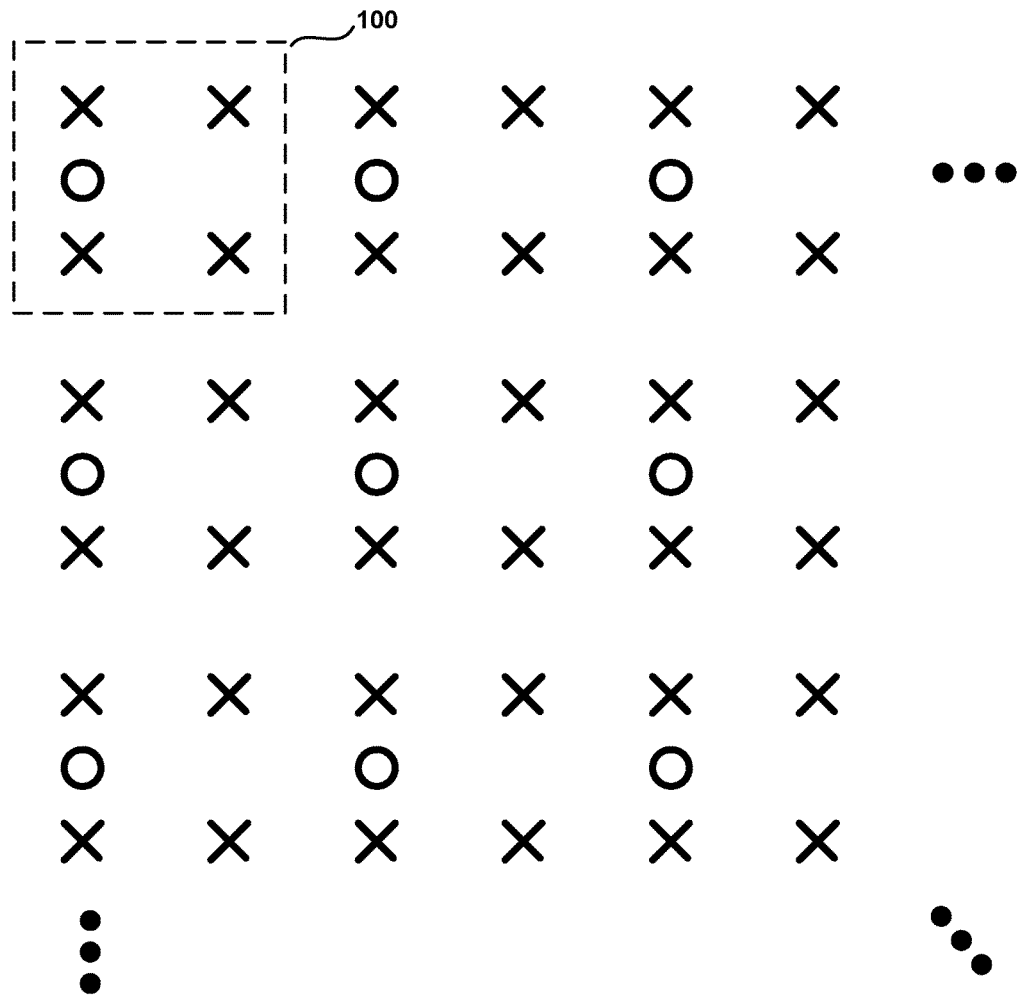
FIG. 2 shows an example of nominal vertical and horizontal locations of 4:2:0 luma and chroma samples in a picture.

FIG. 2 shows an example of nominal vertical and horizontal locations of 4:2:0 luma and chroma samples in a picture. In 4:2:0 sampling, each of the two chroma arrays has half the height and half the width of the luma array, with height and width being measured in terms of number of samples. Thus, as can be seen by the example of sub-block 100 in FIG. 2, in the 4:2:0 sampling format, a 1×1 block of chroma samples corresponds to a 2×2 block of luma samples, meaning chroma blocks have one-fourth the resolution of their corresponding luma blocks in the 4:2:0 sampling format.

Figure 3A:
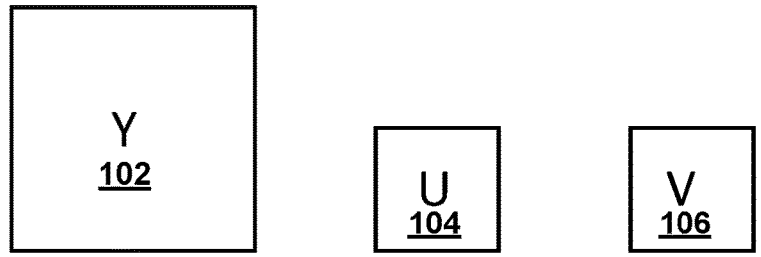
FIGS. 3A-3C are conceptual diagrams illustrating different color sample formats for luma and chroma components of a coding unit.
Figure 3B:
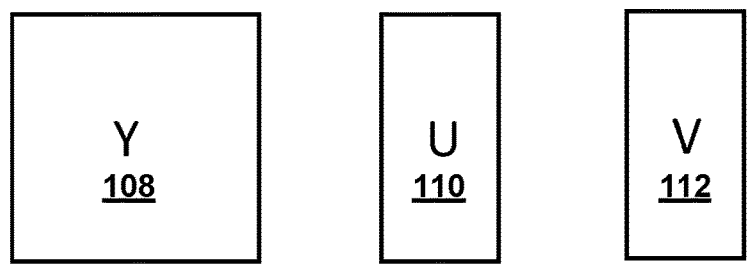
Figure 3C:
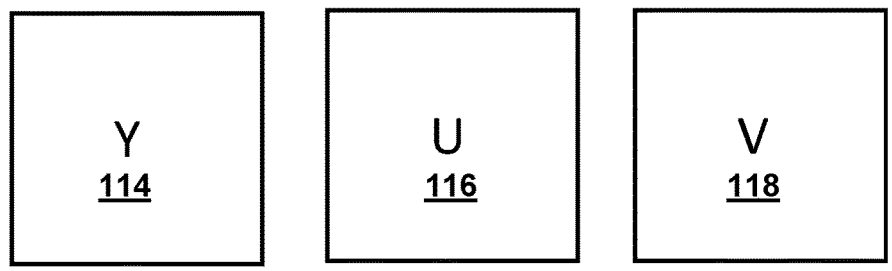

FIGS. 3A-3C are conceptual diagrams illustrating different sample formats for luma (Y) and chroma components (U and V) of a coding unit. FIG. 3A is a conceptual diagram illustrating the 4:2:0 sample format. As illustrated in FIG. 3A, for the 4:2:0 sample format, the chroma components (U 104 and V 106) are one quarter of the size of the luma component (Y 102). Thus, for a CU formatted according to the 4:2:0 sample format, there are four luma samples for every sample of a chroma component. FIG. 3B is a conceptual diagram illustrating the 4:2:2 sample format. As illustrated in FIG. 3B, for the 4:2:2 sample format, the chroma components (U 110 and V 112) are one half of the size of the luma component (Y 108). Thus, for a CU formatted according to the 4:2:2 sample format, there are two luma samples for every sample of a chroma component. FIG. 3C is a conceptual diagram illustrating the 4:4:4 sample format. As illustrated in FIG. 3C, for the 4:4:4 sample format, the chroma components (U 116 and V 118) are the same size as the luma component (Y 114). Thus, for a CU formatted according to the 4:4:4 sample format, there is one luma sample for every sample of a chroma component. Video encoder 20 and video decoder 30 may be configured to code video data in any of a 4:2:0, 4:2:2, or 4:4:4 sample format.

As introduced above, in the field of video coding, it is common to apply filtering in order to enhance the quality of a decoded video signal. Video encoder 20 and video decoder 30 can apply a filter as a post-filter, where a filtered frame is not used for prediction of future frames, or as an in-loop filter, where a filtered frame is used to predict future frame. A filter can be designed for example by minimizing the error between the original signal and the decoded filtered signal. Similar to transform coefficients, video encoder 20 may quantize the coefficients of the filter, h(k,l), k=−K, ..., K,l=−K, ... K, as follows:

$f(k,l)=\text{round}(\text{normFactor} \cdot h(k,l))$.

Video decoder 30 may dequantize the coefficient of the filter as part of decoding the video data. The normFactor can be equal to $2^n$. The larger the value of normFactor the more precise the quantization, and the quantized filter coefficients f(k,l) provide better performance. On the other hand, larger values of normFactor produce coefficients f(k,l) requiring more bits to transmit.

Video decoder 30 applies the decoded filter coefficients f(k,l) to the reconstructed image R(i,j) as follows $$\tilde{R}(i,j) = \sum_{k=-K}^{K} \sum_{l=-K}^{K} f(k,l) R(i+k, j+l) \bigg/ \sum_{k=-K}^{K} \sum_{l=-K}^{K} f(k,l), \quad (1)$$

where i and j are the coordinates of the pixels within the frame.

The in-loop adaptive loop filter employed in JEM was originally proposed in J. Chen, Y. Chen, M. Karczewicz, X. Li, H. Liu, L. Zhang, X. Zhao, "Coding tools investigation for next generation video coding," SG16-Geneva-C806, January 2015. ALF was proposed in HEVC and was included in various working drafts and test model software, i.e., the HEVC Test Model (or "HM"). ALF was, however, not included in the final version of HEVC. Among the related technologies, the ALF design in HEVC test model version HM-3.0 was believed to be the most efficient design. (See T. Wiegand, B. Bross, W. J. Han, J. R. Ohm and G. J. Sullivan, "WD3: Working Draft 3 of High-Efficiency Video Coding," Joint Collaborative Team on Video Coding (JCT-VC) of ITU-T S G16 WP3 and ISO/IEC JTC1/SC29/WG11, JCTVC-E603, 5th Meeting: Geneva, CH, 16-23 Mar. 2011, hereinafter "Working Draft 3 (WD3).")

The ALF design in HM-3.0 is based on picture level optimization. That is, the ALF coefficients are derived after a whole frame is coded. There were two modes for the luma component, block based adaptation (BA) and region based adaptation (RA). These two modes share the same filter shapes and filtering operations as well as syntax elements. One and may be the only difference between BA and RA is the classification method used for selecting a filter.

In one example approach, the classification in BA is at block level. For the luma component, 4×4 blocks in the whole picture are classified based on one-dimensional (1D) Laplacian direction (up to 3 directions) and two-dimensional (2D) Laplacian activity (up to 5 ranges of activity values). In one example approach, each 4×4 block in a picture is assigned a group index based on 1D Laplacian direction and 2D Laplacian activity. One example calculation of direction $Dir_b$ and unquantized activity $Act_b$ is shown in equations (2)-(5) below, where $\hat{I}_{i,j}$ indicates a reconstructed pixel with relative coordinate (i,j) to the top-left pixel position of a 4×4 block, and $V_{i,j}$ and $H_{i,j}$ are the absolute values of vertical and horizontal gradient of the pixel located at (i,j). As such, direction $Dir_b$ is generated by comparing the absolute values of the vertical gradient and the horizontal gradient in the 4×4 block and Actb is the sum of the gradients in both directions in the 4×4 block. Actb is further quantized to the range of 0 to 4, inclusive, as described in WD3.

$$V_{i,j} = |\hat{I}_{i,j} \times 2 - \hat{I}_{i,j-1} - \hat{I}_{i,j+1}| \quad (2)$$

$$H_{i,j} = |\hat{I}_{i,j} \times 2 - \hat{I}_{i,j-1} - \hat{I}_{i,j+1}| \quad (3)$$

$$Dir_b = \begin{cases} 1, & \text{if } \left(\sum_{i=0}^{3}\sum_{j=0}^{3} H_{i,j} > 2 \times \sum_{i=0}^{3}\sum_{j=0}^{3} V_{i,j}\right) \\ 2, & \text{if } \left(\sum_{i=0}^{3}\sum_{j=0}^{3} V_{i,j} > 2 \times \sum_{i=0}^{3}\sum_{j=0}^{3} H_{i,j}\right) \\ 0, & \text{otherwise} \end{cases} \quad (4)$$

$$Act_b = \sum_{i=0}^{3} \sum_{j=0}^{3} \left( \sum_{m=i-1}^{i+1} \sum_{n=j-1}^{j+1} (V_{m,n} + H_{m,n}) \right) \quad (5)$$

In one example approach, therefore, each block can be categorized into one out of fifteen (5×3) groups, also referred to as classes or classifications. An index is assigned to each 4×4 block according to the value of $Dir_b$ and Actb of the block. The group index may be denoted by C and set C equal to $5Dir_b+Â$ where Â is the quantized value of Actb. Therefore, up to fifteen sets of ALF parameters may be signaled for the luma component of a picture. To save the signaling cost, the groups may be merged along group index value. For each merged group, a set of ALF coefficients is signaled.

Figure 4:
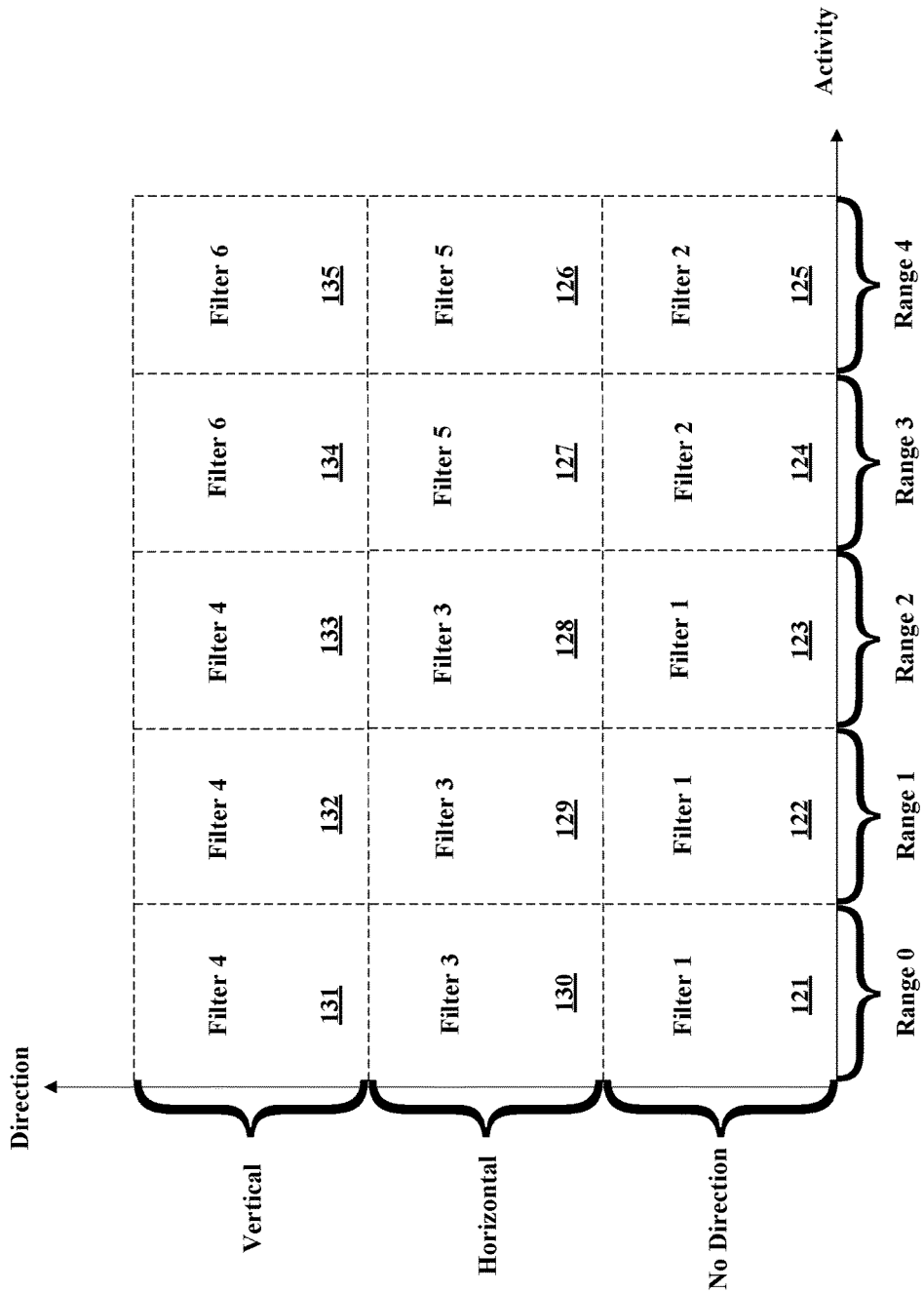
FIG. 4 is a conceptual diagram illustrating a mapping of ranges for an activity metric and a direction metric to filters.

FIG. 4 is a conceptual diagram illustrating these 15 groups used for BA classification. In the example of FIG. 4, filters are mapped to ranges of values for an activity metric (i.e., Range 0 to Range 4) and a direction metric. The direction metric in FIG. 4 is shown as having values of No Direction, Horizontal, and Vertical, which may correspond to the values of 0, 1, and 2 above from equation 3. The particular example of FIG. 4 shows six different filters (i.e. Filter 1, Filter 2 . . . Filter 6) as being mapped to the 15 categories, but more or fewer filters may similarly be used. Although FIG. 4 shows an example, with 15 groups, identified as groups 121 through 135 (or classes 121 through 135), more or fewer groups may also be used. For example, instead of five ranges for the activity metric, more or fewer ranges may be used resulting in more groups. Additionally, instead of only three directions, additional directions (e.g., a 45-degree direction and 135-degree direction) may also be used.

As will be explained in greater detail below, the filters associated with each group may be signaled using one or more merge flags. For one-dimensional group merging, a single flag may be sent to indicate if a group is mapped to the same filter as a previous group. For two-dimensional merging, a first flag may be sent to indicate if a group is mapped to the same filter as a first neighboring block (e.g., one of a horizontal or vertical neighbor), and if that first flag is false, a second flag may be sent to indicate if the group is mapped to a second neighboring block (e.g., the other of the horizontal neighbor or the vertical neighbor).

Filter coefficients (sometimes called filter taps) may be defined or selected in order to promote desirable levels of video block filtering that can reduce blockiness and/or improve the video quality in other ways. A set of filter coefficients, for example, may define how filtering is applied along edges of video blocks or other locations within video blocks. Different values for filter coefficients may cause different levels of filtering with respect to different pixels of the video blocks. Filtering, for example, may smooth or sharpen differences in intensity of adjacent pixel values in order to help eliminate unwanted artifacts.

In this disclosure, the term "filter" generally refers to a set of filter coefficients and/or a filter shape. For example, a 3×3 filter may be defined by a set of 9 filter coefficients, a 5×5 filter may be defined by a set of 25 filter coefficients, a 9×5 filter may be defined by a set of 45 filter coefficients, and so on. The term "set of filters" generally refers to a group of more than one filter. For example, a set of two 3×3 filters could include a first set of 9 filter coefficients and a second set of 9 filter coefficients. The term "shape," sometimes called the "filter support," generally refers to the number of rows of filter coefficients and number of columns of filter coefficients for a particular filter. For example, 9×9 is an example of a first shape, 7×5 is an example of a second shape, and 5×9 is an example of a third shape. In some instances, filters may take non-rectangular shapes including diamond-shapes, diamond-like shapes, circular shapes, circular-like shapes, hexagonal shapes, octagonal shapes, cross shapes, X-shapes, T-shapes, other geometric shapes, or numerous other shapes or configurations.

Figures 5A, 5B, 5C:
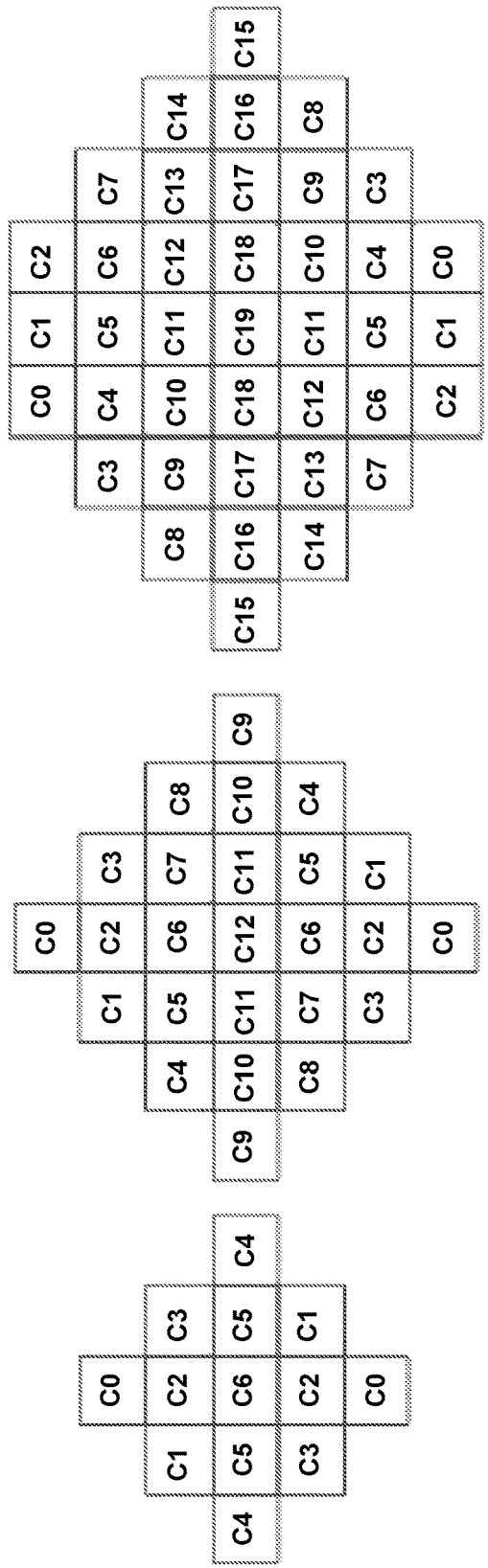
FIGS. 5A-5C are conceptual diagrams illustrating example filter shapes.

In one example approach, up to three circular symmetric filter shapes are supported. In one such example approach, the three filter shapes are the ones shown in FIGS. 5A-5C. In the examples shown, FIG. 5A illustrates a 5×5 diamond, FIG. 5B illustrates a 7×7 diamond, and FIG. 5C illustrates a truncated 9×9 diamond. The examples in FIGS. 5A-5C are diamond shapes; however other shapes may be used. In most common cases, regardless of the shape of the filter, the center pixel in the filter mask is the pixel that is being filtered. In other examples, the filtered pixel may be offset from the center of the filter mask. In the examples of FIGS. 5A-5C, C0-C19 are intended to represent different filter coefficients. Each of C0-C19 may be associated with a value, typically an integer value, for a filter coefficient.

In some implementations of ALF, including the ALF design of HM-3.0, only a single filter (i.e., a single set of ALF coefficients) is available for the two chroma components, meaning samples of the chroma components are either filtered by the single filter or are not ALF filtered. Thus, instead of selecting from a set of two or more filters, as can be done for luma samples, all samples of the chroma components that are ALF filtered are filtered using the same filter. In one such approach, the filter used is a 5×5 diamond shape filter.

Each pixel sample $Î_{i,j}$ may be filtered to $I'_{i,j}$ based on the calculations as shown in equation (6) below, where L denotes filter length, $f_{m,n}$ represents filter coefficient, and o indicates filter offset or DC coefficient.

$$I'_{i,j}=\Sigma_{m=-L}^{L}\Sigma_{n=-L}^{L}f_{m,n}\times Î_{i+m,j+n}+o \qquad (6)$$

In order to implement ALF, filter information is signalled in the encoded video bitstream. A total number of filters (or total number of merged groups), in a set of filters, may first be signaled when ALF is enabled for one slice. The filters in the set of filters may be used to filter the luma component. For a chroma component, as only one filter may be applied, there may be no need to signal such information. An index of the three filter supports may be signaled. Classes which have non-consecutive values of C could be merged, i.e., share the same filter. By coding one flag for each class to indicate if class is merged or not, the filter index can be derived.

The froceCoeff0 flag may be used to indicate whether at least one of the filters should not be coded. When this flag is equal 0, all of the filters should be coded. When this flag is equal 1, one flag of each merged group, denoted by CodedVarBin, is further signaled to indicate the filter should be signaled or not. When the filter is not signaled, all of the filter coefficients associated with the filter are set equal to 0.

The ALF design of HM-3.0 includes a prediction method for signaling filters. When multiple groups of filters need to be signaled, one of the following two methods may be used. In a first example, all the filters are coded directly into the filter information. In this case, for example, the values of filter coefficients may be encoded into the bitstream without using any predictive encoding techniques. In a second example, the filter coefficients of the first filter are directly coded, while the remaining filters are predictively coded into the filter information. In this case, the values of filter coefficients may be defined by residual values or differences relative to the filter coefficients associated with a previously coded filter. The previously coded filter is the most recently coded filter, meaning that the filter indices of a current filter and the predictor for the current filter are consecutive. To indicate the usage of one of the above two example methods, one flag may be coded when the number of merged groups is larger than 1 and the syntax element froceCoeff0 is equal to 0.

The ALF design of HM-3.0 utilizes temporal prediction of filter coefficients. The ALF coefficients of previously coded pictures are stored and allowed to be reused as ALF coefficients of a current picture. The current picture may choose to use stored ALF coefficients, and bypass the ALF coefficients signalling. In this case, only an index to one of the reference pictures is signalled, and the stored ALF coefficients of the indicated picture are simply inherited for the current picture. To indicate the usage of temporal prediction, one flag is firstly coded (e.g., generated by video encoder 20 and received by video decoder 30) before sending the index.

In the JEM 4 design, ALF parameters from at most six previous pictures are stored in a separate array. The array is effectively emptied for intra random access point (IRAP) pictures. To avoid duplicates, ALF parameter values are only stored in the array when explicitly signalled. Storing of parameters operates in a first in, first out (FIFO) fashion; so if the array is full, a new set of ALF parameter values overwrites the oldest parameters, in decoding order.

The ALF design of HM-3.0 utilizes geometric transformations-based ALF. In references M. Karczewicz, L. Zhang, W.-J. Chien, X. Li, "Improvements on adaptive loop filter," Exploration Team (JVET) of ITU-T SG 16 WP 3 and ISO/IEC JTC 1/SC 29/WG 11, Doc. JVET-B0060_r1, 2nd Meeting: San Diego, USA, 20-26 Feb. 2016 (hereinafter "JVET-B0060") and M. Karczewicz, L. Zhang, W.-J. Chien, X. Li, "EE2.5: Improvements on adaptive loop filter," Exploration Team (JVET) of ITU-T SG 16 WP 3 and ISO/IEC JTC 1/SC 29/WG 11, Doc. JVET-C0038, $3^{rd}$ Meeting: Geneva, May 2016 (hereinafter (JVET-C0038"), the Geometric transformations-based ALF (GALF) is proposed which has been adopted to JEM3.0. In GALF, the classification of luma component is modified with the diagonal gradients taken into consideration and geometric transformations could be applied to filter coefficients. Each 2×2 luma block is categorized into one out of 25 classes based on directionality and quantized value of activity, as described in JVET-B0060. Additionally, a transformation index is also assigned according to gradient values, as shown below:

TABLE 1

Mapping of the gradient calculated for one block and the transformations as described in JVET-B0060.

| Gradient values | Transformation | Transformation Index |
| --- | --- | --- |
| $g_{d2} < g_{d1}$ and $g_h < g_v$ | No transformation | 0 |
| $g_{d2} < g_{d1}$ and $g_v < g_h$ | Diagonal | 1 |
| $g_{d1} < g_{d2}$ and $g_h < g_v$ | Vertical flip | 2 |
| $g_{d1} < g_{d2}$ and $g_v < g_h$ | Rotation | 3 |

However, for the chroma components, no classification is applied. That is, the whole slice is either all filtered or not filtered by the slice on/off control flag. This is the same as in JEM2.0.

In addition, to improve coding efficiency when temporal prediction is not available (intra frames), a set of 16 fixed filters is assigned to each class. That is, 16*25(classes) filters may be pre-defined. To indicate the usage of the fixed filter, a flag for each class is signaled and if required, the index of the chosen fixed filter. Even when the fixed filter is selected for a given class, the coefficients of the adaptive filter f(k,l) can still be sent for this class in which case the coefficients of the filter which will be applied to the reconstructed image are a sum of both sets of coefficients. Number of classes can share the same coefficients f(k,l) signaled in the bitstream even if different fixed filters were chosen for them. U.S. Patent Publication 2017/0238020 A1, published Aug. 17, 2017, describes techniques for applying fixed filters to inter-coded frames.

The ALF design of HM-3.0 also utilizes techniques for implicitly coding filter coefficients. The design of temporal prediction from previously coded frames as in JEM2.0 is kept unchanged. That is, a flag is coded to indicate whether temporal prediction is used. If so, an index of the selected pictures for stored ALF parameters is further signaled. In this case, there is no need to signal the filter indices for each class and filter coefficients.

The ALF design of HM-3.0 utilizes explicit coding of filter coefficients including explicit coding based on prediction patterns and prediction indexes from fixed filters. Three cases are defined: case 1: whether none of the filters of the 25 classes are predicted from the fixed filter; case 2: all filters of the classes are predicted from the fixed filter; and case 3: filters associated with some classes are predicted from fixed filters and filters associated with the rest of the classes are not predicted from the fixed filters. An index may be firstly coded to indicate one of the three cases. In addition, the following may apply:

For case 1, there is no need to further signal the index of fixed filter.

Otherwise, for case 2, an index of the selected fixed filter for each class is signaled Otherwise, for case 3, one bit for each class is firstly signaled, and if fixed filter is used, the index is further signaled.

With respect to filter indexes, to reduce the number of bits required to represent the filter coefficients, different classes can be merged. An example of such merging is described in WD3. However unlike in WD3, any set of classes can be merged, even classes having non-consecutive values of C. The information on which classes are merged is provided by sending for each of the 25 classes an index $i_C$. Classes having the same index $i_C$ share the same filter coefficients that are coded. The index $i_C$ is coded with truncated fixed length method.

Similarly, the forceCoef0 flag is also used. And when the forceCoef0 flag is equal to 1, a one bit flag, denoted by CodedVarBin for each of the merged groups (all filters to be coded) is further signalled to indicate whether the signaled filter coefficients are all zero. Moreover, when forceCoef0 is equal to 1, predictive coding, i.e., coding the difference between current filter and previously coded filter, is disabled.

It should be noted that when prediction from fixed filters is allowed, the filters to be signaled/coded mentioned above are the differences between the filter applied to the reconstructed image and the selected fixed filter. Other information, such as coefficients are coded in the same way as in JEM2.0.

Work on ALF is ongoing by JVET and others. In references J. An, J. Zheng, "Unified Adaptive Loop Filter for Luma and Chroma," Exploration Team (JVET) of ITU-T SG 16 WP 3 and ISO/IEC JTC 1/SC 29/WG 11, Doc. JVET-E0079-v4, $5^{th}$ Meeting: Geneva, January 2017 (hereinafter "JVET-E0079") and J. An, J. Zheng, "Unified Adaptive Loop Filter for Luma and Chroma," Exploration Team (JVET) of ITU-T SG 16 WP 3 and ISO/IEC JTC 1/SC 29/WG 11, Doc. JVET-F0051-v2, $6^{th}$ Meeting: Hobart, March 2017 (hereinafter "JVET-F0051"), techniques for unifying luma and chroma filtering processes are proposed to further improve the coding efficiency of chroma components. The comparisons of different aspects for filtering chroma components among the current JEM design (GALF) and references JVET-E0079 and JVET-F0051 are summarized as follows:

TABLE 2 comparisons of chroma filtering method in GALF and JVET-E0079 and JVET-F0051

|  | JEM 5.0.1 (GALF) | JVET-E0079 | JVET-F0051 |
| --- | --- | --- | --- |
| Classification | N/A | Two methods depending on one slice-level flag: No classification as in GALF Calculate class index (as well as transformation index) for each 2 × 2 chroma block | Two methods depending on one slice-level flag: No classification as in GALF For each 1 × 1 chroma block, reuse the classification and transformation indices from the corresponding 2 × 2 luma block (4:2:0 color format, co-located luma block) |
| Block on/off control | Controlled in slice-level | CTU-level on/off control | Two methods depending on one slice-level flag: Inherited from co-located luma block CTU-level on/off control |
| Filter support | 5 × 5 diamond with one set of filter coefficients to be signaled, if applicable | Two methods depending on one slice-level flag: For each class (and transformation index) inherited from luma (either 9 × 9/7 × 7/5 × 4 diamond), no need to signal the filter coefficients 5 × 5 diamond, one set of filter coefficients need to be signaled, if applicable | Two methods depending on one slice-level flag: For each class (and transformation index), 5 × 5 diamond with filter coefficients inherited from luma component after potential modifications 5 × 5 diamond, one set of filter coefficients need to be signaled, if applicable |

Generally speaking, the chroma filtering techniques described in JVET-E0079 and JVET-F0051 potentially produce a better rate-distortion trade off compared to the techniques of the GALF design of JEM 5.0.1. The techniques of JVET-E0079 and JVET-F0051, however, also potentially substantially increase computational complexity compared to the techniques of the GALF design of JEM 5.0.1

The GALF design of JEM 5.0.1 and the techniques for unifying luma and chroma filtering described in JVET-E0079 and JVET-F0051 may have several potential problems. As an example of one potential problem, the design of chroma filtering in GALF is quite simple with either a whole chroma slice being filtered with the same filter or the whole chroma slice not being filtered at all. Such a design does not consider the local diversity of chroma components, and thus, such a design may not reduce distortion by a desirable amount. As a second example of a potential problem, performing 2×2 block level classification, as proposed in JVET-E0079, may produce additional coding gain (e.g., reduce distortion), but does so at the cost of increased computational complexity due to the need to calculate gradients and activity metrics for each 2×2 chroma block.

As a third example of a potential problem, reusing luma classification results, as proposed in JVET-F0051, avoids the added complexity of the classification calculations required in JVET-E0079, but requires additional computational complexity, such as numerous memory fetches, associated with performing filtering for each 1×1 block. Additionally, performing filtering for each 1×1 block as proposed in JVET-F0051, may result in low throughput due to frequently switching filters, which can require a large number of memory calls to retrieve new filters. As a fourth example of a potential problem, in some coding scenarios, the luma component and the chroma components may have different edges. Thus, directly reusing the classification information from the corresponding luma block may result in filtering that causes more distortion and/or less compression.

The techniques of this disclosure may address some of the problems discussed above. The following itemized techniques may be applied individually. Alternatively, any combination of them may be applied. In addition, the proposed techniques may also be applicable to other filtering methods which may require block-level classification operations.

The techniques below will be described with respect to video decoder 30, but it should be understood that the described techniques may also be performed by video encoder 20. Specifically, as part of encoding video data, video encoder 20 also decodes the video data in order to test various encoding hypotheses. Video encoder 20 also decodes the video data so that video encoder 20 can maintain the same decoded picture buffer as video decoder 30. Thus, video encoder 20 applies the same filtering that video decoder 30 applies.

According to the techniques of this disclosures, video decoder 30 may be configured to perform classification and filter selection for luma components on a K*L block level with block width being equal to K and block height being equal to L. K and L may, for example, both be equal to 2 as in the GALF design of JEM 5.0.1. Video decoder 30 may be configured to perform classification and filter selection for chroma components on an M*N block level. M and N may, for example, both be equal to 1 as in JVET-F0051. The ratio of chroma width compared to luma width can be denoted by $R_w$, and the ratio of chroma height compared to luma height can be denoted by $R_H$. $R_w$ and $R_H$ may both be equal to ½ for 4:2:0 color format video and both be equal to 1 for 4:4:4 color format video. $R_w$ and $R_H$ may be equal to ½ and 1, respectively, for 4:2:2 color format video.

As used in this disclosure, the term luma block unit refers to a group of luma samples for which a single classification is jointly determined. Hence, all luma samples in a luma block unit are filtered using the same filter. Similarly, the term chroma block unit refers to a group of chroma samples for which a single classification is jointly determined. Hence, all chroma samples in a chroma block unit are filtered using the same filter. A luma block unit may, for example, be a 1×1, 2×2, 4×4, or some other size block, and a chroma block unit may similarly be a 1×1, 2×2, 4×4, or some other size block. The sizes of luma block units and chroma block units are typically independent of the sizes of block partitions used for determining predictive blocks and transform blocks. A reconstructed luma block, for example, may typically include multiple luma block units, and a reconstructed chroma block may typically include multiple chroma block units.

According to techniques of this disclosure, one chroma block unit may correspond to one or multiple luma block units. Video decoder 30 may derive filter information for the chroma block unit (including but not limited to, for example, filter coefficients, on/off control, classification results) from one or more corresponding luma block units. As will be described in more detail below, video decoder 30 may, for example, filter the chroma block unit using the same filter used to filter a luma block unit, filter the chroma block unit using a modified version of a filter used to filter the luma block unit, use a classification result for the luma block unit to select a filter from a group of chroma-specific filters, or may determine not to filter the chroma block unit at all.

In one example, the width and/or height of the chroma block unit for determining filter information may be larger than the width and/or height for a luma block unit multiplied by the width/height ratio due to color format. That is, one chroma block unit with size equal to M*N may correspond to multiple (M*N/(K*$R_w$*L*$R_H$)) luma block units. In one example, M may be larger than K*$R_w$. In another example, N may be larger than L*$R_H$. In some examples, for a 4:2:0 color format, K, L, M, N may all be equal to 2 or may all be equal to 4. In such examples, one chroma block unit for filtering corresponds to four luma block units.

According to techniques of this disclosure, even in some coding scenarios where one or more corresponding luma block units are filtered, video decoder 30 may disable filtering for the chroma block unit. For example, video decoder 30 may determine an edge direction, such as one of the direction metrics discussed above, for the chroma block unit and determine edge directions for the luma block units, and if none of the luma block units have a similar edge direction to the chroma block unit, then video decoder 30 may disable filtering for the chroma block unit. Video decoder 30 may, for example, derive the edge directions for the chroma block unit using any of the classification techniques described above, using a Sobel operator (e.g., a Sobel-Feldman operator or Sobel filter), using gradient values, or using any other such technique for detecting the presence of edges in images.

According to techniques of this disclosure, when one chroma block unit corresponds to multiple luma block units, video decoder 30 may determine filter information for the chroma block unit by selecting one of the corresponding luma block units and using the filter information for the selected one of the corresponding luma block units to filter the chroma block unit. In one example, video decoder 30 may select the most frequently used filter among all the corresponding luma block units to filter the chroma block unit.

In another example, video decoder 30 may select the luma block unit located at a certain relative position and reuse the filter information for that luma block unit to filter the chroma block unit. The luma block unit located at the certain relative position may, for example, be the luma block unit located at the top-left of the multiple block units, the luma block unit located at a center of the multiple luma block units, or some other luma block unit at a different relative position. In one example, if filtering is disabled for the luma block unit located at the certain relative position, then video decoder 30 may either select another luma block unit or may determine that filtering for the chroma block unit is also disabled.

According to another example, to determine filter information for the chroma block unit by selecting one of the corresponding luma block units, video decoder 30 may select one of the corresponding luma block units according to the class indices and/or transformation indices of the luma block units. Video decoder 30 may then filter the chroma block unit using the filter information of the selected luma block unit.

According to another example, to determine filter information for the chroma block unit by selecting one of the corresponding luma block units, video decoder 30 may determine an edge direction for the chroma block unit and determine which one of the multiple luma block units has an edge direction that most closely matches the edge direction of the chroma block unit. Video decoder 30 may then filter the chroma block unit using the filter information of the luma block unit that has the edge direction that most closely matches the edge direction of the chroma block unit.

Video decoder 30 may determine the filter of the chroma block unit based on one or more of the filters for the corresponding luma block units. In some example, video decoder 30, may apply a transformation, as described above, to a filter used for a luma block unit. For example, if the edge direction for a selected luma block unit is not aligned with the edge direction for the chroma block unit, then video decoder 30 may apply a transformation to the filter coefficients used for the luma block unit. In other examples, video decoder 30 may generate a new filter by combining multiple filters. The combination of multiple filters may be achieved by assigning different weights for different filter coefficients.

For the various techniques described above, the block unit sizes for filter selection/classification, i.e., the sizes of the luma block units and the chroma block units, may be signaled in a sequence parameter set (SPS), picture parameter set (PPS), slice header, or other such location within the video data bitstream. In some examples, the block sizes for classification may be dependent on slice types or coding modes. In some examples, the block sizes for classification may be pre-defined without signaling.

Figure 6:
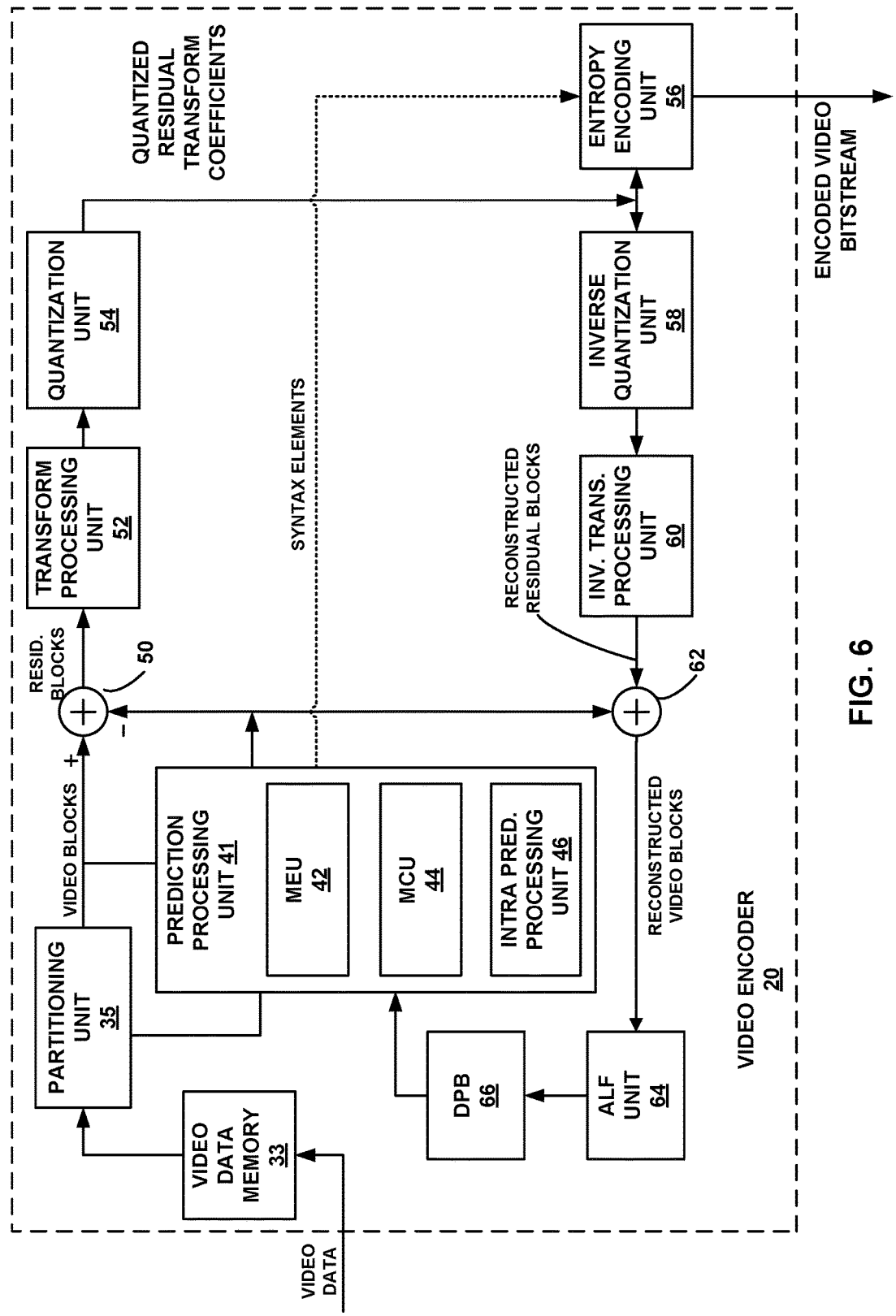
FIG. 6 is a block diagram illustrating an example video encoder that may implement the techniques described in this disclosure.

FIG. 6 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 6, video encoder 20 includes a video data memory 33, partitioning unit 35, prediction processing unit 41, summer 50, transform processing unit 52, quantization unit 54, and entropy encoding unit 56. Prediction processing unit 41 includes motion estimation unit (MEU) 42, motion compensation unit (MCU) 44, and intra prediction processing unit 46. For video block reconstruction, video encoder 20 also includes inverse quantization unit 58, inverse transform processing unit 60, summer 62, ALF unit 64, and decoded picture buffer (DPB) 66.

As shown in FIG. 6, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as well as video block partitioning, e.g., according to a quadtree structure of LCUs and CUs or according to another partitioning structure. Video encoder 20 generally illustrates the components that encode video blocks within a video slice to be encoded. The slice may be divided into multiple video blocks (and possibly into sets of video blocks referred to as tiles). Prediction processing unit 41 may select one of multiple possible coding modes, such as one of multiple intra coding modes or one of multiple inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction processing unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

ALF unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Although not explicitly shown in FIG. 4, video encoder 20 may include additional filters such as of a deblock filter, a sample adaptive offset (SAO) filter, or other types of loop filters. A deblock filter may, for example, apply deblocking filtering to filter block boundaries to remove blockiness artifacts from reconstructed video. An SAO filter may apply offsets to reconstructed pixel values in order to improve overall coding quality. Additional loop filters (in loop or post loop) may also be used. ALF unit 64 in conjunction with other components of video decoder 30 may be configured to perform the various techniques described in this disclosure.

Figure 7:
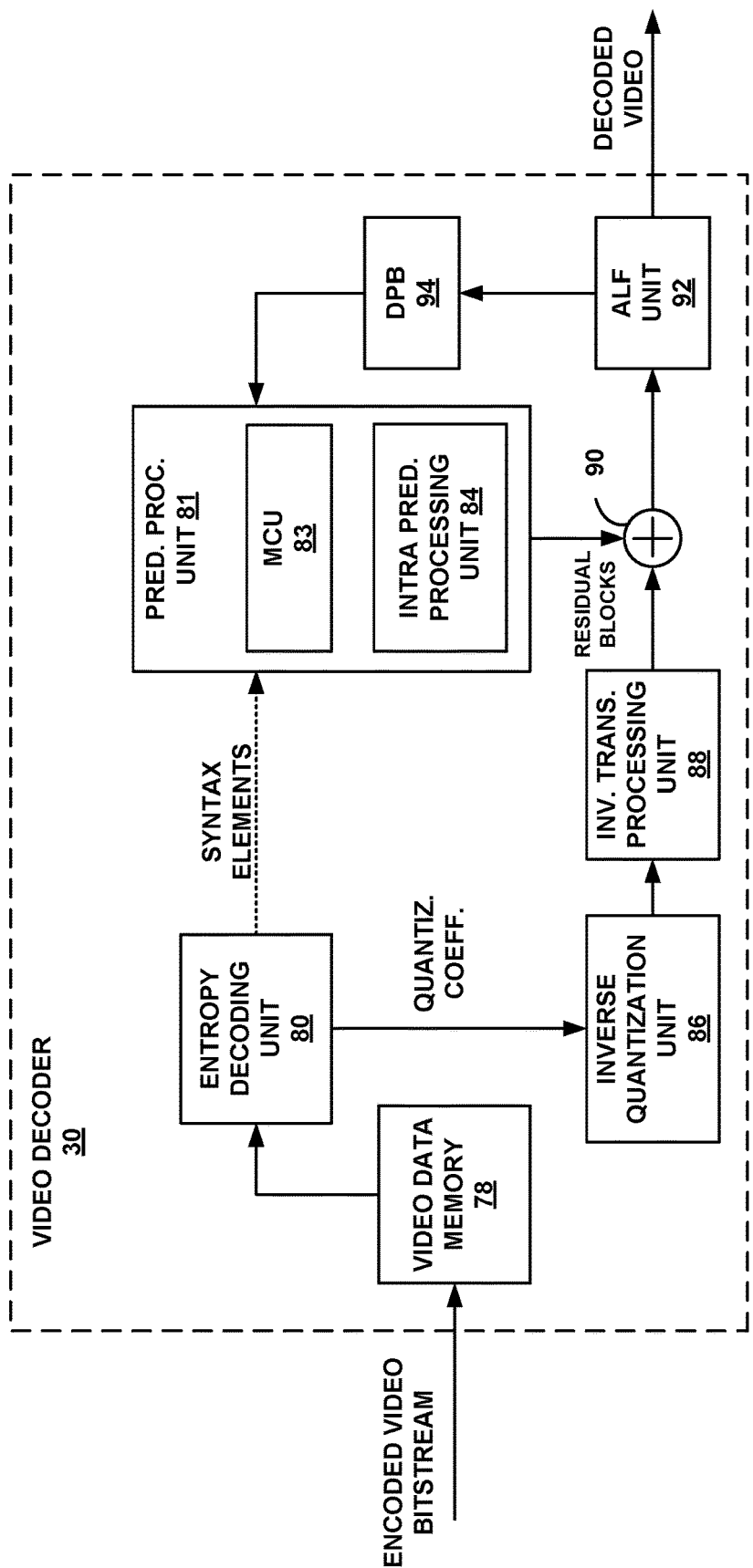
FIG. 7 is a block diagram illustrating an example video decoder that may implement the techniques described in this disclosure.

FIG. 7 is a block diagram illustrating an example video decoder 30 that may implement the techniques described in this disclosure. Video decoder 30 of FIG. 7 may, for example, be configured to receive the signaling described above with respect to video encoder 20 of FIG. 6. In the example of FIG. 7, video decoder 30 includes video data memory 78, entropy decoding unit 80, prediction processing unit 81, inverse quantization unit 86, inverse transform processing unit 88, summer 90, ALF unit 92, and DPB 94. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 6.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., de-quantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation.

ALF unit 92 filters the reconstructed video block using, for example, one or more of the ALF techniques described in this disclosure. Although not explicitly shown in FIG. 6, video decoder 30 may also include one or more of a deblocking filter, an SAO filter, or other types of filters. Other loop filters (either in the coding loop or after the coding loop) may also be used to smooth pixel transitions or otherwise improve the video quality. The decoded video blocks in a given frame or picture are then stored in DPB 94, which stores reference pictures used for subsequent motion compensation. DPB 94 may be part of or separate from additional memory that stores decoded video for later presentation on a display device, such as display device 32 of FIG. 1. ALF unit 92 in conjunction with other components of video decoder 30 may be configured to perform the various techniques described in this disclosure.

Figure 8:
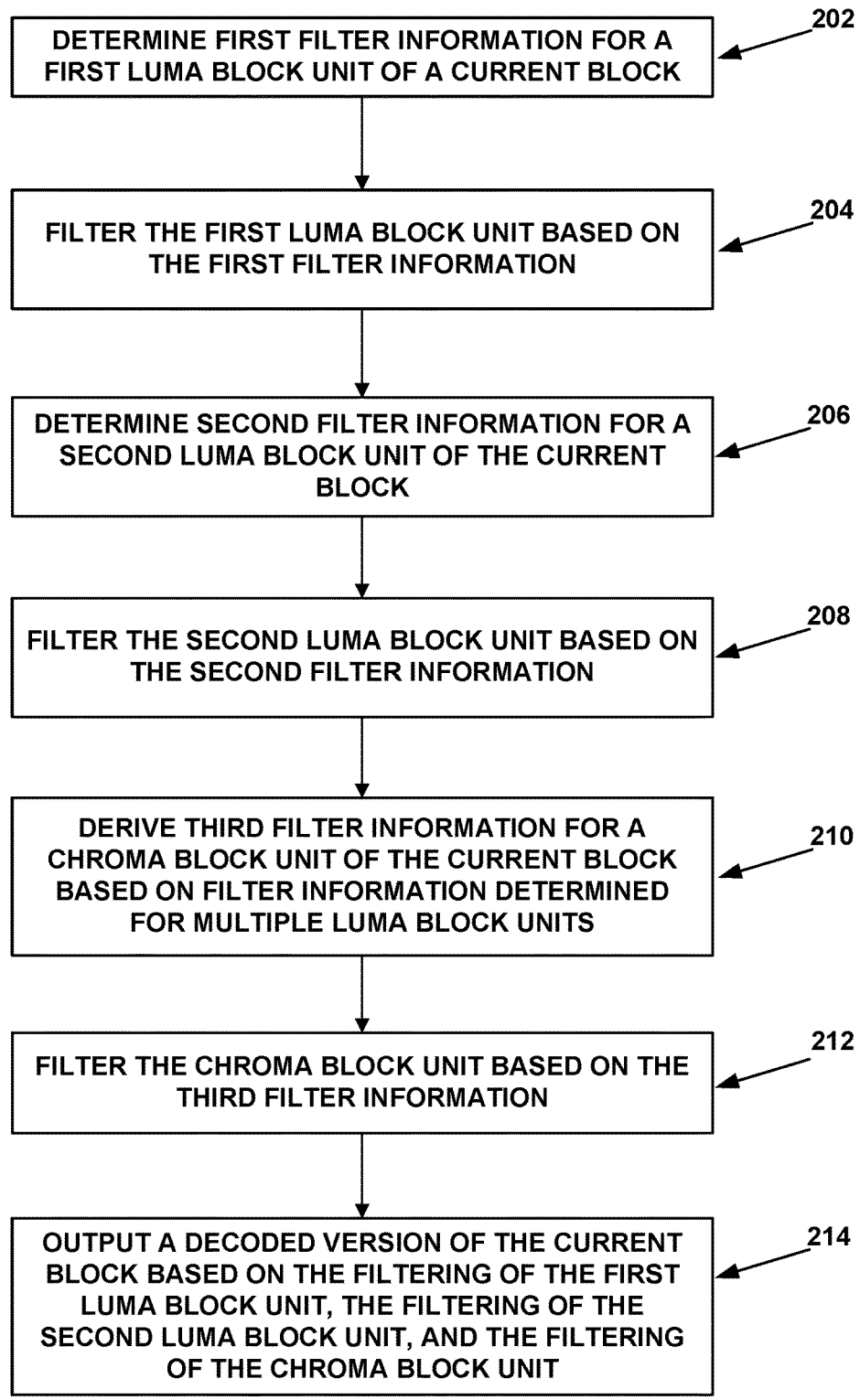
FIG. 8 is a flowchart illustrating an example method of decoding video data in accordance with techniques described in this disclosure.

FIG. 8 is a flow diagram illustrating an example video decoding technique described in this disclosure. The techniques of FIG. 8 will be described with reference to a generic video decoder, such as but not limited to video decoder 30. In some instances, the techniques of FIG. 8 may be performed by a video encoder such as video encoder 20, in which case the generic video decoder corresponds to the decoding loop of the video encoder.

In the example of FIG. 8, the video decoder determines first filter information for a first luma block unit of a current block (202). The first filter information may, for example, include any of a filter (e.g., filter coefficients and a filter shape), on/off control, or classification results. The video decoder filters the first luma block unit based on the first filter information (204). The video decoder may determine an activity metric for the first luma block unit and a direction metric for the first luma block unit; based on the activity metric for the first luma block unit and the direction metric for the first luma block unit, the video decoder may determine a classification for the first luma block unit; and based on the classification for the first luma block unit, the video decoder may determine a filter for the first luma block unit.

The video decoder may, for example, determine the activity metric using equations (2), (3), and (5) above and determine the direction metric using equations (2), (3), and (4) above. The techniques of this disclosure, however, are not limited to any particular types of activity metrics or direction metrics. Each classification may, for example, be defined by a combination of a value for the direction metric and a value range for the activity metric, such as the 15 classes shown in FIG. 4 or the 25 classes described in WD3.

As shown in the example of FIG. 4, classifications may be mapped to filters, and the video decoder may determine a filter for the first luma block unit based on the classification determined for the first luma block unit.

The video decoder can determine second filter information for a second luma block unit of the current block (206). The second filter information may, for example, include any of a filter (e.g., filter coefficients and a filter shape), on/off control, or classification results and may be the same or different than the first filter information. The video decoder filters the second luma block unit based on the second filter information (208). The video decoder may determine an activity metric for the second luma block unit and a direction metric for the second luma block unit; based on the activity metric for the second luma block unit and the direction metric for the second luma block unit, determine a classification for the second luma block unit; and based on the classification for the second luma block unit, determine a filter for the second luma block unit.

Using FIG. 4 for purposes of illustration, the video decoder may, for example, determine that the first luma block unit has a horizontal direction and an activity value that falls in range 2, meaning the first luma block unit belongs to class 128. Therefore, the video decoder selects filter 3 to filter the first luma block unit. The video decoder may also determine that the second luma block unit has a horizontal direction and an activity value that falls in range 3, meaning the first luma block unit belongs to class 127. Therefore, the video decoder selects filter 5 to filter the first luma block unit The video decoder can derive third filter information for a chroma block unit of the current block based on filter information determined for multiple luma block units (210). The filter information for the multiple luma block units includes the first filter information for the first luma block unit and the second filter information for the second luma block unit.

In one example, the video decoder may derive the third filter information for the chroma block unit of the current block based on the filter information determined for the multiple luma block units by identifying a filter used to filter the first luma block unit. The video decoder may then filter the chroma block unit based on the third filter information by filtering the chroma block unit using the filter used to filter the first luma block unit.

In another example, the video decoder may derive the third filter information for the chroma block unit of the current block based on the filter information determined for the multiple luma block units by identifying a filter used to filter the first luma block unit and modifying the filter used to filter the first luma block unit to determine a modified version of the filter used to filter the first luma block unit. The video decoder may then filter the chroma block unit based on the third filter information by filtering the chroma block unit using the modified version of the filter used to filter the first luma block unit. To modify the filter used to filter the first luma block unit to determine the modified version of the filter used to filter the first luma block unit, the video decoder may apply a geometric transformation to the filter used to filter the first luma block unit. Examples of geometric transformations include no transformation, diagonal, vertical flip, and rotation as set forth in Table 1 above.

In other examples, to modify the filter used to filter the first luma block unit to determine the modified version of the filter used to filter the first luma block unit, the video decoder may combine the filter used to filter the first luma block unit with a filter used to filter the second luma block unit by applying a weighting function to filter coefficients of the filter used to filter the first luma block unit and to filter coefficients of the filter used to filter the second luma block unit. As one example of applying a weighting function, for filter coefficients at the same relative positions in a filter shape, the video decoder may apply a weight of 0.5 to filter coefficients of the filter used to filter the first luma block unit and a weight of 0.5 to filter coefficients of the filter used to filter the second luma block unit, such that the modified version of the filter is effectively an average of the two filters. As another example of applying a weighting function, for filter coefficients at the same relative positions in a filter shape, the video decoder may apply a weight of 0.75 to filter coefficients of the filter used to filter the first luma block unit and a weight of 0.25 to filter coefficients of the filter used to filter the second luma block unit, such that the modified version of the filter is more similar to the filter used to filter the first luma block unit than the filter used to filter the second luma block unit.

In one example, to derive the third filter information for the chroma block unit of the current block based on the filter information determined for the multiple luma block units, the video decoder may determine an edge direction for each of the multiple luma block units; determine an edge direction for the chroma block unit; and in response to the edge direction for the chroma block unit being different than each of the edge directions for the multiple luma block units, determine that filtering is disabled for the chroma block unit. The edge directions determined for each of the multiple luma block units and determined for the chroma block unit may, for example, be any of the horizontal, vertical, 45-degree, 135-degree, or no direction values described above.

In another example, to derive the third filter information for the chroma block unit of the current block based on the filter information determined for the multiple luma block units, the video decoder may determine an edge direction for each of the multiple luma block units; determine an edge direction for the chroma block unit; and in response to the edge direction for the chroma block unit matching an edge direction for one of the multiple luma block units, selecting as the third filter information, filter information for the one of the multiple luma block units with the matching edge direction.

In one example, to derive the third filter information for the chroma block unit of the current block based on the filter information determined for the multiple luma block units, the video decoder may determine that filtering is disabled for at least one luma block unit of the multiple luma block units and, based on filtering being disabled for the at least one luma block unit of the multiple luma block units, determine that filtering is disabled for the chroma block unit. In another example, to derive the third filter information for the chroma block unit of the current block based on the filter information determined for the multiple luma block units, the video decoder may determine that filtering is disabled for at least one luma block unit of the multiple luma block units and, based on filtering being disabled for the at least one luma block unit of the multiple luma block units, determine the third filtering information based on another luma block unit of the multiple luma block units for which filtering is not disabled.

In another example, to derive the third filter information for the chroma block unit of the current block based on the filter information determined for the multiple luma block units, the video decoder selects as the third filter information, a most frequently used filter for the multiple luma block units. In another example, to derive the third filter information for the chroma block unit of the current block based on the filter information determined for the multiple luma block units, the video decoder selects as the third filter information, filter information of a luma block unit located at a certain relative position within the multiple luma block units. The certain relative position may, for example, be a top-left corner, a center, or some other position.

In some examples, the video decoder may determine a transformation index for each of the multiple luma block units and derive the third filter information for the chroma block unit of the current block based on the filter information determined for the multiple luma block units by selecting, based on the determined transformation indices, filter information of one of the multiple luma block units as the third filter information. Each transformation index may identify a geometric transformation used for filtering each of the multiple luma block units as described above. Examples of geometric transformations include no transformation, diagonal, vertical flip, and rotation as set forth in Table 1 above.

In other examples, the video decoder may determine a class for each of the multiple luma block units and derive the third filter information for the chroma block unit of the current block based on the filter information determined for the multiple luma block units by selecting, based on the determined classes, filter information of one of the multiple luma block units as the third filter information.

The video decoder can filter the chroma block unit based on the third filter information (212). The third filter information may, for example, include any of a set of filter coefficients, a classification result, a determination of whether filtering is on or off for the chroma block, or other such filter information.

The video decoder outputs a decoded version of the current block based on the filtering of the first luma block unit, the filtering of the second luma block unit, and the filtering of the chroma block unit (214). In instances where the video decoder is part of a video encoder, then the video decoder may output the decoded version of the current block based on the filtering of the first luma block unit, the filtering of the second luma block unit, and the filtering of the chroma block unit by storing a decoded picture including the decoded version of the current block in a decoded picture buffer for use as a reference picture in encoding subsequent pictures of video data. In instances where the video decoder is decoding the video data for display, then the video decoder may output the decoded version of the current block based on the filtering of the first luma block unit, the filtering of the second luma block unit, and the filtering of the chroma block unit by storing a decoded picture, including the decoded version of the current block, in a decoded picture buffer for use as reference picture in decoding subsequent pictures of video data and by outputting a decoded picture, including the decoded version of the current block, to a display device.

In some examples, the first luma block unit may be a first K×L luma block and the second luma block unit may be a second K×L block that is different than the first K×L block, with K being equal to a width in luma samples and L is equal to height in luma samples. The chroma block unit may be an M×N chroma block, with M being equal to a width in chroma samples and N being equal to a height in chroma samples. The chroma block unit may correspond to Z luma block units, with Z being equal to $M*N/(K*R_W*L*R_H)$. $R_W$ is equal to a ratio of chroma width to luma width for a color format of the current block, and $R_H$ is equal to a ratio of chroma height to luma height for the color format of the current block. The Z luma block units include the first luma block unit and the second luma block unit. The value of M may be greater than a value of $K*R_w$. The value of N may be greater than a value of $L*R_H$.

In one particular example with a 4:2:0 color format, $R_H$ and $R_w$ are both equal to ½, with K, L, M, and N all equal 2 and Z equal to 4. In another particular example with a 4:2:0 color format, $R_H$ and $R_w$ are both equal to ½, with K, L, M, and N all equal 4 and Z equal to 4.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
   determining first filter information for a first luma block unit of a current block, wherein the first filter information includes a first filter;
   filtering the first luma block unit using the first filter;
   determining second filter information for a second luma block unit of the current block, wherein the second filter information includes a second filter that is different than the first filter;
   filtering the second luma block unit using the second filter;
   deriving third filter information for a chroma block unit of the current block based on the first filter information, wherein deriving the third filter information for the chroma block unit of the current block based on the first filter information comprises deriving a third filter based on the first filter;
   filtering the chroma block unit using the third filter; and
   outputting a decoded version of the current block based on the filtering of the first luma block unit, the filtering of the second luma block unit, and the filtering of the chroma block unit.

2. The method of claim 1, wherein the third filter information comprises an indication that filtering is on for the chroma block unit.

3. The method of claim 1, further comprising:
   determining an edge direction for each of the first and second luma block units
   determining an edge direction for the chroma block unit;
   in response to the edge direction for the chroma block unit matching the edge direction for the first luma block unit and not matching the edge direction for the second luma block unit, selecting as the third filter information, the first filter information.

4. The method of claim 1, further comprising:
   determining that the first filter is a most frequently used filter for multiple luma block units corresponding to the chroma block unit, wherein the multiple luma block units include the first luma block unit and the second luma block unit; and
   in response to the first filter being the most frequently used filter for the multiple luma block units corresponding to the chroma block unit, selecting as the third filter information, the first filter information.

5. The method of claim 1, further comprising:
   determining that the first luma block unit is located at a certain relative position within multiple luma block units corresponding to the chroma block unit, wherein the multiple luma block units include the first luma block unit and the second luma block unit;
   in response to determining that the first luma block unit is located at the certain relative position within multiple luma block units, selecting as the third filter information, the first filter information of a luma block unit.

6. The method of claim 1, further comprising:
determining a transformation index for each of multiple luma block units corresponding to the chroma block unit, wherein each transformation index identifies a geometric transformation used for filtering each of the multiple luma block units, and wherein the multiple luma block units include the first luma block unit and the second luma block unit; and
wherein deriving the third filter information for the chroma block unit of the current block comprises:
selecting, based on the determined transformation indices, the first filter information as the third filter information.

7. The method of claim 1, further comprising:
determining a class for each of multiple luma block units corresponding to the chroma block unit, wherein the multiple luma block units include the first luma block unit and the second luma block unit; and
selecting, based on the determined classes, the first filter information as the third filter information.

8. The method of claim 1, wherein:
the first luma block unit is a first K×L luma block and the second luma block unit is a second K×L block that is different than the first K×L block;
K is equal to a width in luma samples and L is equal to height in luma samples;
the chroma block unit is an M×N chroma block;
M is equal to a width in chroma samples and N is equal to a height in chroma samples;
the chroma block unit corresponds to Z luma block units;
Z is equal to $M*N/(K*R_w*L*R_H)$;
$R_W$ is equal to a ratio of chroma width to luma width for a color format of the current block;
$R_H$ is equal to a ratio of chroma height to luma height for the color format of the current block; and
the Z luma block units comprise the first luma block unit and the second luma block unit.

9. The method of claim 8, wherein a value of M is greater than a value of $K*R_w$.

10. The method of claim 1, wherein the method for decoding the video data is performed as part of a video encoding process and wherein outputting the decoded version of the current block based on the filtering of the first luma block unit, the filtering of the second luma block unit, and the filtering of the chroma block unit comprises storing a decoded picture comprising the decoded version of the current block in a decoded picture buffer for use as reference picture in encoding subsequent pictures of video data.

11. The method of claim 1, wherein deriving the third filter information for the chroma block unit of the current block based on the filter information determined for the multiple luma block units comprises combining a filter for the first luma block unit with a filter for the second luma block unit to generate a third filter, the method further comprising:
filtering the chroma block unit with the third filter.

12. A device for decoding video data, the device comprising:
a memory configured to store the video data; and
one or more processors configured to:
determine first filter information for a first luma block unit of a current block, wherein the first filter information includes a first filter;
filter the first luma block unit using the first filter;
determine second filter information for a second luma block unit of the current block, wherein the second filter information includes a second filter that is different than the first filter;
filter the second luma block unit using the second filter;
derive third filter information for a chroma block unit of the current block based on the first filter information, wherein deriving the third filter information for the chroma block unit of the current block based on the first filter information comprises deriving a third filter based on the first filter;
filter the chroma block unit using the third filter; and
output a decoded version of the current block based on the filtering of the first luma block unit, the filtering of the second luma block unit, and the filtering of the chroma block unit.

13. The device of claim 12, wherein the third filter information comprises an indication that filtering is on for the chroma block unit.

14. The device of claim 12, wherein the one or more processors are configured to:
determine an edge direction for each of the first and second luma block units
determine an edge direction for the chroma block unit; and
in response to the edge direction for the chroma block unit matching the edge direction for the first luma block unit and not matching the edge direction for the second luma block unit, select as the third filter information, the first filter information.

15. The device of claim 12, wherein the one or more processors are configured to:
determine that the first filter is a most frequently used filter for multiple luma block units corresponding to the chroma block unit, wherein the multiple luma block units include the first luma block unit and the second luma block unit; and
in response to the first filter being the most frequently used filter for the multiple luma block units corresponding to the chroma block unit, select as the third filter information the first filter information.

16. The device of claim 12, wherein the one or more processors are configured to:
determine that the first luma block unit is located at a certain relative position within multiple luma block units corresponding to the chroma block unit, wherein the multiple luma block units include the first luma block unit and the second luma block unit;
in response to determining that the first luma block unit is located at the certain relative position within multiple luma block units, select as the third filter information, the first filter information.

17. The device of claim 12, wherein the one or more processors are configured to:
determine a transformation index for each of multiple luma block units corresponding to the chroma block unit, wherein each transformation index identifies a geometric transformation used for filtering each of the multiple luma block units, and wherein the multiple luma block units include the first luma block unit and the second luma block unit; and
to derive the third filter information for the chroma block unit of the current block select, based on the determined transformation indices, the first filter information as the third filter information.

18. The device of claim 12, wherein the one or more processors are configured to determine a class for each of multiple luma block units corresponding to the chroma block unit, wherein the multiple luma block units include the first luma block unit and the second luma block unit; and select, based on the determined class, the first filter information as the third filter information.

19. The device of claim 12, wherein:

the first luma block unit is a first K×L luma block and the second luma block unit is a second K×L block that is different than the first K×L block;

K is equal to a width in luma samples and L is equal to height in luma samples;

the chroma block unit is an M×N chroma block;

M is equal to a width in chroma samples and N is equal to a height in chroma samples;

the chroma block unit corresponds to Z luma block units;

Z is equal to $M*N/(K*R_W*L*R_H)$;

$R_W$ is equal to a ratio of chroma width to luma width for a color format of the current block;

$R_H$ is equal to a ratio of chroma height to luma height for the color format of the current block; and the Z luma block units comprise the first luma block unit and the second luma block unit.

20. The device of claim 19, wherein a value of M is greater than a value of $K*R_w$.

21. The device of claim 12, wherein the one or more processors are configured to decoded the video data as part of a process for encoding the video data, and wherein to output the decoded version of the current block based on the filtering of the first luma block unit, the filtering of the second luma block unit, and the filtering of the chroma block unit, the one or more processors are configured to store a decoded picture comprising the decoded version of the current block in a decoded picture buffer for use as reference picture in encoding subsequent pictures of video data.

22. The device of claim 12, wherein the device comprises a wireless communication device comprising at least one of a transmitter configured to modulate a signal comprising encoded video data or a receiver configured to demodulate a received signal comprising received encoded video data.

23. An apparatus for decoding video data, the apparatus comprising:

means for determining first filter information for a first luma block unit of a current block, wherein the first filter information includes a first filter;

means for filtering the first luma block unit using the first filter;

means for determining second filter information for a second luma block unit of the current block, wherein the second filter information includes a second filter that is different than the first filter;

means for filtering the second luma block unit using the second filter;

means for deriving third filter information for a chroma block unit of the current block based on the first filter information, wherein the means for deriving the third filter information for the chroma block unit of the current block based on the first filter information comprises deriving a third filter based on the first filter;

means for filtering the chroma block unit using the third filter; and means for outputting a decoded version of the current block based on the filtering of the first luma block unit, the filtering of the second luma block unit, and the filtering of the chroma block unit.

24. A computer readable storage medium storing instructions that when executed by one or more processors cause the one or more processors to:

determine first filter information for a first luma block unit of a current block, wherein the first filter information includes a first filter;

filter the first luma block unit using the first filter;

determine second filter information for a second luma block unit of the current block, wherein the second filter information includes a second filter that is different than the first filter;

filter the second luma block unit using the second filter;

derive third filter information for a chroma block unit of the current block based on the first filter information, wherein deriving the third filter information for the chroma block unit of the current block based on the first filter information comprises deriving a third filter based on the first filter;

filter the chroma block unit using the third filter; and output a decoded version of the current block based on the filtering of the first luma block unit, the filtering of the second luma block unit, and the filtering of the chroma block unit.

* * * * *